United States Patent
Van Nguyen

(10) Patent No.: US 8,026,019 B2
(45) Date of Patent: Sep. 27, 2011

(54) FUEL CELL WITH PROTON EXCHANGE MEMBRANE BONDED TO ACRYLIC PLASTIC ELEMENT

(75) Inventor: Trung Van Nguyen, Lawrence, KS (US)

(73) Assignee: NK Technologies, LLC, Lawrence, KS (US)

( * ) Notice: Subject to any disclaimer, the term of this patent is extended or adjusted under 35 U.S.C. 154(b) by 959 days.

(21) Appl. No.: 11/654,754

(22) Filed: Jan. 18, 2007

(65) Prior Publication Data

US 2008/0176110 A1 Jul. 24, 2008

(51) Int. Cl.
- H01M 2/08 (2006.01)
- H01M 2/14 (2006.01)
- H01M 4/64 (2006.01)
- H01M 4/66 (2006.01)
- H01M 8/00 (2006.01)

(52) U.S. Cl. ........ 429/510; 429/511; 429/519; 429/520; 429/535

(58) Field of Classification Search .............. 429/30, 429/33, 36, 46, 469, 468, 535, 510, 511, 429/519, 520
See application file for complete search history.

(56) References Cited

U.S. PATENT DOCUMENTS

| | | | |
|---|---|---|---|
| 6,641,862 B1 | 11/2003 | Grot | |
| 6,733,914 B1 | 5/2004 | Grot et al. | |
| 6,740,445 B1 | 5/2004 | Grot | |
| 7,534,517 B2 * | 5/2009 | Hiroi et al. | 429/34 |
| 2005/0123819 A1 * | 6/2005 | Hiroi et al. | 429/36 |

OTHER PUBLICATIONS

Product Information from Kubota Research Associates, Inc., "Kubota Research Announces P-Wave™ Membond™ and Collaborates with Ion Power, Inc. to Accelerate Fuel Cell Research", May 4, 2006.
Product Information from DuPont, "General Information on Nafion® Membrane for Electrolysis", Bulletin 97-01, Revised Jan. 4, 1999.
Product Information from Ion Power, Inc., "Turn on with Ion Power Catalyzed Membranes".

* cited by examiner

Primary Examiner — Patrick Ryan
Assistant Examiner — Julian Anthony
(74) Attorney, Agent, or Firm — Stinson Morrison Hecker LLP

(57) ABSTRACT

A proton exchange membrane fuel cell comprises a membrane formed from a fluorocarbon ionic polymer material capable of being bonded to an acrylic, preferably a polymethylmethacrylate polymer, and at least one desirably electrically conductive plate bonded to an area of a face of the membrane via an acrylic plastic material. The bond may be accomplished by positioning a layer of the acrylic plastic material between a surface of the plate and an area of a face of the membrane. Alternatively, the plate may be constructed of the acrylic plastic material and a surface thereof may be bonded directly to an area of a face of the membrane.

7 Claims, 3 Drawing Sheets

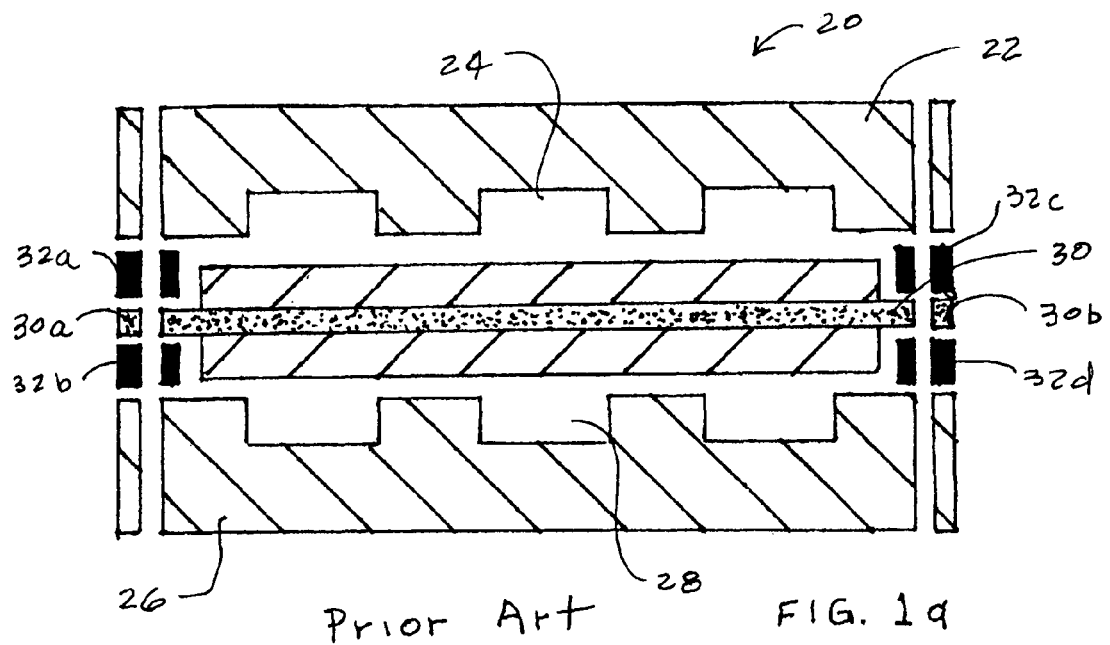
Prior Art    FIG. 1a
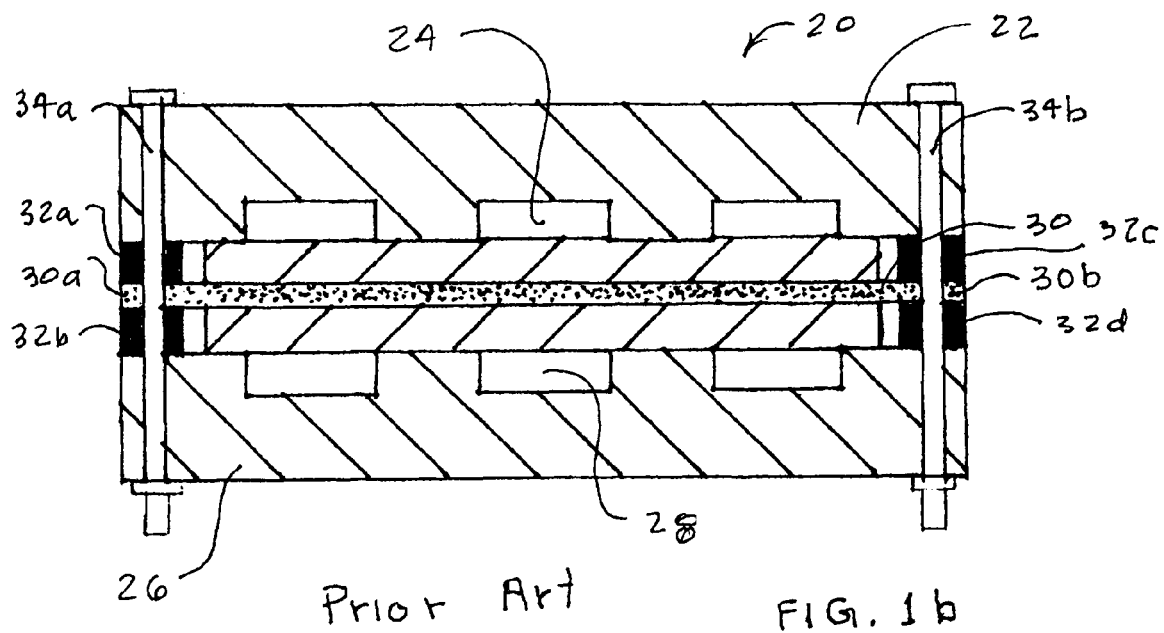
Prior Art    FIG. 1b

FUEL CELL WITH PROTON EXCHANGE MEMBRANE BONDED TO ACRYLIC PLASTIC ELEMENT

CROSS REFERENCE TO RELATED APPLICATION

None

BACKGROUND OF THE INVENTION

1. Field of the Invention

The invention of the present application relates to fuel cells and to methodology for preparing the same. In particular, the invention relates to proton exchange membrane (PEM) fuel cells and to the components and methodology for securing gas reservoir and/or current collector plates to PEMs.

2. The Prior Art Background

PEM fuel cells generally may be constructed in the form of assemblies which include a membrane with two electrodes, one on each side of the membrane. Such an assembly is generally referred to as a membrane and electrode assembly (MEA). A respective plate is placed in contact with each electrode. Typically each such plate has channels or compartments therein which act as fuel and oxidant reservoirs for the electrodes. When such plates are electrically conductive they may also act as electrical current collectors for the fuel cell.

In the past, and among other things, gaskets have often been utilized to seal the fuel and oxidant compartments from the ambient surroundings. Such gaskets are generally situated at the peripheral sides of the exposed membrane as shown in FIGS. 1a and 1b which schematically depict a prior art PEM fuel cell. With reference to FIGS. 1a and 1b, the former depicts the fuel cell in an exploded condition while the latter depicts the assembled fuel cell. As shown in FIGS. 1a and 1b, the fuel cell 20 includes a fuel plate 22 having a fuel reservoir compartment or channels 24 and an oxidant plate 26 with oxidant reservoir compartment or channels 28. An MEA 30 is positioned between the plates 22, 26 and has its outer edges 30a, 30b compressed between gaskets 32a, 32b, 32c, 32d using nut and bolt assemblies 34a, 34b.

Other prior art fuel cells are illustrated in U.S. Pat. No. 6,641,862, U.S. Pat. No. 6,740,445 and U.S. Pat. No. 6,733,914, the entireties of the disclosures of which are incorporated herein by this specific reference thereto.

It is necessary to insure a secure and appropriate seal around the edges of the membrane and so either compression must be applied via the plates or some sort of bonding material must be applied between the gasket and the membrane and between the gasket and the adjacent surfaces of the plates. Adhesion without the need for compressive means such as the nut and bolt assemblies 34a, 34b of FIG. 1b is desirable; however, finding a suitable bonding material for this application has been a very challenging task because the membranes used in such a fuel cell system undergo physical changes (i.e., swelling and shrinkage) as the same gain and lose water during operation.

SUMMARY OF THE INVENTION

An important and essential object of the present invention, therefore, is to provide a PEM fuel cell wherein a secure and appropriate seal is provided between the MEA and the fuel and/or oxidant plates associated therewith. To this end, and in accordance with the concepts and principles of one very important aspect of the invention, a novel PEM fuel cell is provided which comprises a membrane formed from a material capable of being bonded to an acrylic plastic and at least one acrylic plastic element having a surface bonded to an area of a face of the membrane.

In further accordance with the concepts and principles of the invention, the membrane may desirably be formed from a material that is capable of being thermally and compressively bonded to an acrylic plastic, preferably a fluorocarbon ionic polymer, ideally Nafion®. In further accordance with the concepts and principles of the invention, the acrylic plastic material may desirably comprise a polymethylmethacrylate polymer.

In still further accordance with the concepts and principles of the invention, the PEM fuel cells may include a fuel or oxidant plate that is bonded to a proton exchange fuel cell membrane utilizing a layer of acrylic plastic disposed between the membrane and the plate. Alternatively, the plate itself may be formed from the acrylic plastic and the same may be bonded directly to the membrane.

Another important and essential object of the present invention is to provide a method for preparing a PEM fuel cell comprising supplying a membrane formed from a material capable of being bonded to an acrylic plastic and affixing a plate, which is either a fuel plate or an oxidant plate, to said membrane using an acrylic plastic substance. In accordance with this aspect of the invention, the acrylic substance may be in the form of a layer of the same disposed between the membrane and a fuel or oxidant plate. In the alternative, the plate itself may be formed from an acrylic plastic substance and the same may be bonded directly to the membrane. Desirably, the membrane may be a fluorocarbon ionic polymer, preferably Nafion. Ideally the acrylic plastic may comprise a polymethylmethacrylate polymer.

In one preferred form of the invention, the membrane may be thermally bonded to a face of the acrylic plastic substance using heat and compression.

Desirably, in accordance with the invention, the plates may be electrically conductive whereby to act as electrical current collectors for the fuel cell.

BRIEF DESCRIPTION OF THE DRAWINGS

FIG. 1a is a schematic, exploded, cross-sectional depiction illustrating a prior art PEM fuel cell;

FIG. 1b is a schematic, cross-sectional depiction illustrating the PEM fuel cell of FIG. 1a after assembly of the separate components;

DETAILED DESCRIPTION OF THE PREFERRED EMBODIMENTS

Figure 2A:
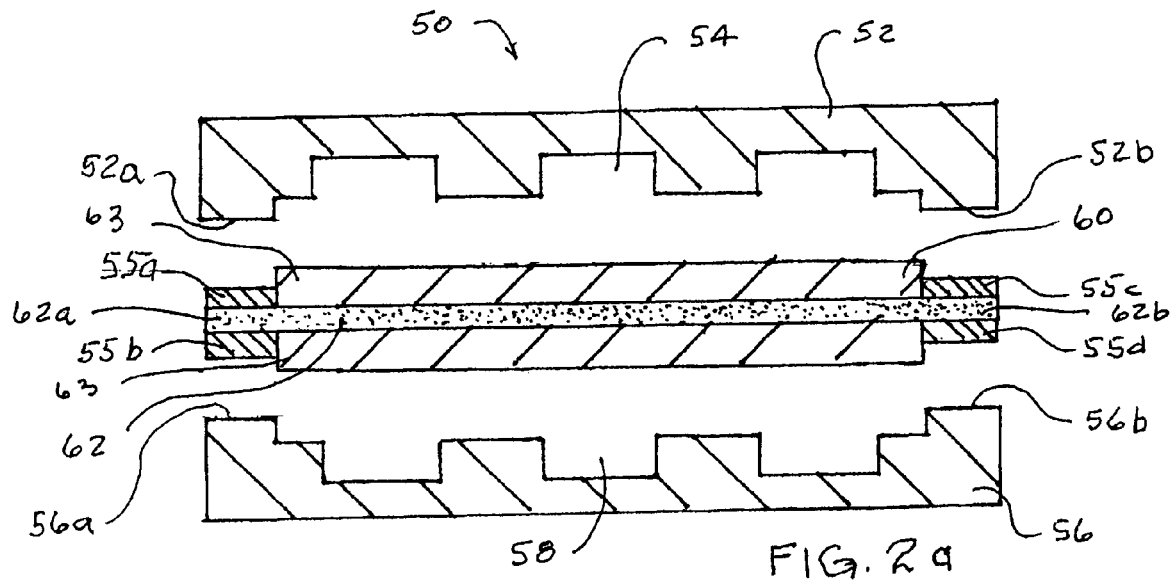
FIG. 2a is a schematic, exploded, cross-sectional depiction illustrating an embodiment of a PEM fuel cell which includes the principles and concepts of the invention.
Figure 2B:
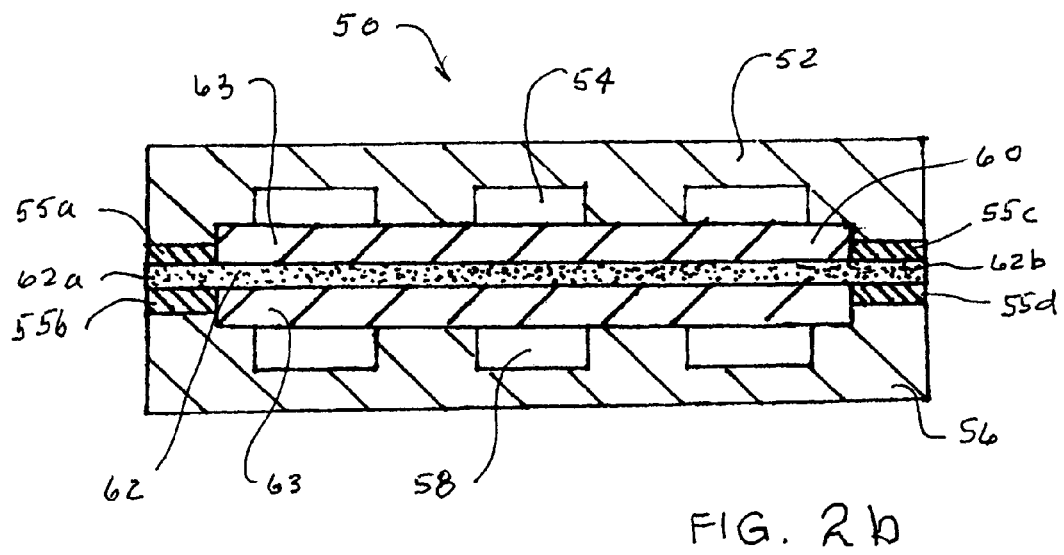
FIG. 2b is a schematic, cross-sectional depiction illustrating the PEM fuel cell of FIG. 2a after assembly of the separate components.

A PEM fuel cell 50 which embodies the principles and concepts of the invention is illustrated in FIGS. 2a and 2b where it can be seen that the same may desirably include a fuel plate 52 having a fuel compartment or channels 54 and a oxidant plate 56 having an oxidant compartment or channels 58. In this regard, the plates 52, 56 of FIGS. 2a, 2b are similar to the plates 22, 26 of the prior art cell 20. The fuel cell 50 also includes an MEA 60 which again is similar to the MEA 30 of FIGS. 1a, 1b. However, and in accordance with the invention, the fuel cell 50 which embodies the invention may include acrylic layers or elements 55a, 55b, 55c, 55d disposed respectively between the edges 62a, 62b of the membrane 62 of MEA 60 and the adjacent edges 52a, 52b, 56a, 56b of the plates 52, 56, as shown. In accordance with the invention, the MEA 60 may be a conventional product such as the MEAs manufactured by Ion Power, Inc. In this regard, the MEA 60 may preferably include a catalyst layer 63 on each side thereof as shown schematically in FIGS. 2a, 2b. Desirably, the plates 52, 56 may be electrically conductive whereby to act as electrical current collectors for the fuel cell 50.

In further accordance with the principles and concepts of the invention which is the subject of the present application, it has been discovered that the membrane 62 of the MEA 60 may desirably be formed of a fluorocarbon ionic polymer, preferably a perfluorosulfonic acid polymer, such as Nafion® (Nafion® is a registered trademark of E.I. du Pont de Nemours Company), or the like. In this regard, and in still further accordance with the principles and concepts of the invention, it has been discovered that fluorocarbon ionic polymer materials may be thermally bonded directly to an acrylic plastic, preferably polymethylmethacrylate, surface using heat and compression. Since acrylic plastics themselves are readily bondable to many surfaces by any one or more of a multitude of available adhesives, this approach allows areas of a face of a membrane such as the membrane 62 of the MEA 60 of the PEM fuel cell 50 to be bonded to a surface of the fuel plate 52 or oxidant plate 56, or both, thereby providing an excellent and very facile process for sealing the MEA 60 and the fuel and oxidant compartments 54, 58 from the surrounding ambient. This reduces and perhaps completely eliminates the need for the use of compressive devices such as the nut and bolt assemblies 34a, 34b of FIG. 1b for applying compression to seal the fuel cell assembly. FIGS. 2a, 2b thus show an embodiment of the invention in which acrylic films 55a, 55b, 55c, 55d bonded to faces of the membrane 62 at edges 62a, 62b thereof are glued to corresponding surfaces 52a, 52b, 56a, 56b of the fuel and oxidant plates 52, 56 and the fuel and oxidant are provided to the cell 50 through channels 54, 58 of the fuel and oxidant plates 52, 56.

Figure 3:
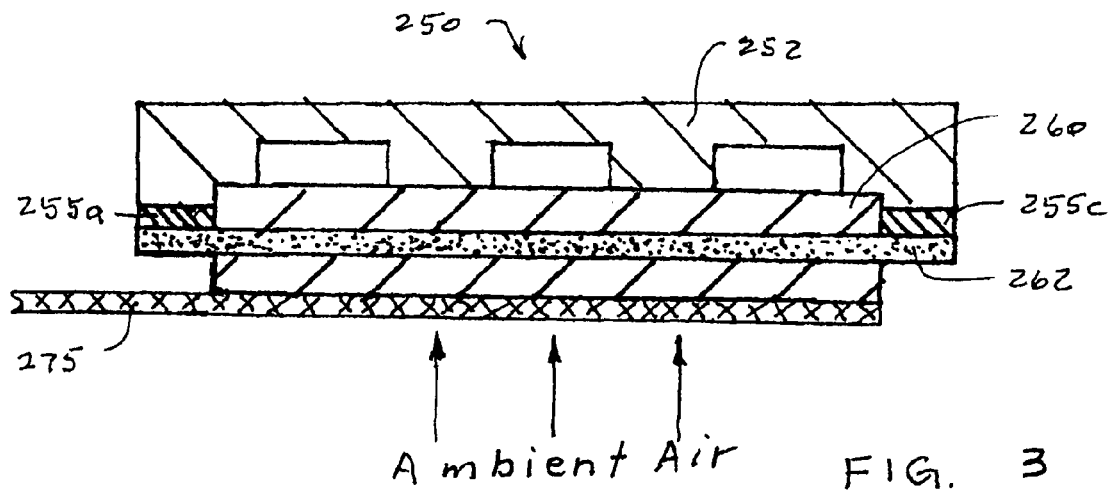
FIG. 3 is a schematic, cross-sectional depiction illustrating a second embodiment of a PEM fuel cell which embodies the principles and concepts of the invention.

Another embodiment of a PEM fuel cell which embodies and incorporates the concepts and principles of the invention is illustrated in FIG. 3 where the cell is identified by the reference numeral 250. In FIG. 3 it can be seen that fuel may be provided to cell 250 through a fuel plate 252 and the membrane 262 of the MEA 260 is bonded to acrylic elements 255a, 255c which in turn are glued to the fuel plate 252. The cell 250 may preferably be provided with an integrated current collector 275 on the oxidant side, and the oxidant, air as an example, may then be obtained directly from ambient as is indicated schematically in FIG. 3.

Figure 4:
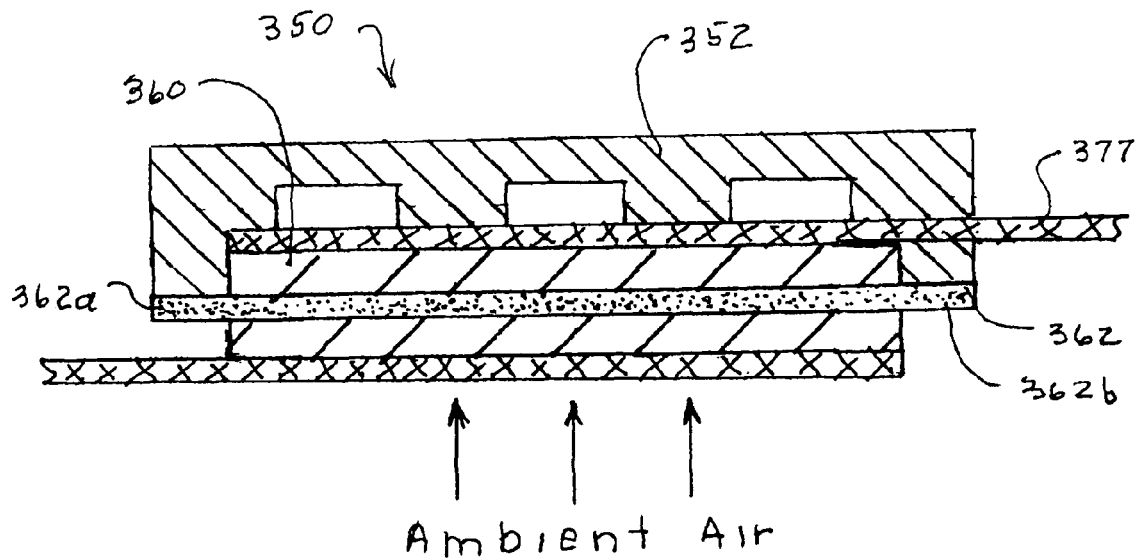
FIG. 4 is a schematic, cross-sectional depiction illustrating a third embodiment of a PEM fuel cell which embodies the principles and concepts of the invention.

FIG. 4 illustrates a cell 350 which is similar to the cell 250 of FIG. 3, except in this case the entire fuel plate 352 may desirably be formed from an acrylic plastic. The corresponding surfaces at the edges of acrylic plastic fuel plate 352 may then be thermally bonded directly to areas of the face of the membrane 362 of MEA 360 at the edges 362a, 362b thereof. With this construction, acrylic elements such as the acrylic elements 255a, 255c of FIG. 3 are not needed and may be eliminated completely. Also, in this embodiment the cell 350 may desirably include an integrated current collector 377 on the fuel side as shown.

With further reference to FIGS. 2a, 2b, and as would be readily apparent to one of ordinary skill in the PEM fuel cell art, either the fuel plate 52, or the oxidant plate 56, or both, could be made entirely of an acrylic plastic, like the plate 352 of FIG. 4, and thermally bonded directly to the edges 62a, 62b of the membrane 62. In each of these cases, the corresponding acrylic layers may then be eliminated thereby avoiding the need for the intermediate step of attaching acrylic elements to the corresponding plates. In such a case it would be desirable to include an integrated current collector, such as the collector 377 of FIG. 4, on each side where the plate is made entirely of plastic since acrylic plastics are not generally considered to be electrically conductive materials.

In the foregoing description, during the assembly of a fuel cell which includes a layer or film of acrylic plastic it has sometimes been indicated that the sequence of assembly might be to first bond the acrylic layer or element to the edges of the membrane and then to attach the respective plate to the acrylic layer. However, and as would be readily apparent to one of ordinary skill in the art, it is perhaps equally valuable to sometimes reverse this procedure and first attach the acrylic layer to the plate and then bond the acrylic layer to the membrane.

I claim:

1. A proton exchange membrane fuel cell comprising:
a plate having a peripheral edge, said plate being either a fuel plate or an oxidant plate, said plate being made entirely of an acrylic plastic and including an integral sealing element portion at said peripheral edge; and
a membrane formed from a material capable of being bonded to an acrylic plastic, said membrane having an edge,
said sealing element portion being located adjacent said edge of the membrane and having a surface bonded to an area at said edge of said membrane.

2. A proton exchange membrane fuel cell as set forth in claim 1, comprising an integrated current collector for said membrane.

3. A proton exchange membrane fuel cell as set forth in claim 1, wherein said material is capable of being thermally bonded to an acrylic plastic using heat and compression and said surface of said sealing element portion is thermally bonded to said membrane.

4. A proton exchange membrane fuel cell as set forth in claim 1, wherein said membrane has two opposing sides, said cell comprising two of said plates, one of said plates being a fuel plate and the other being an oxidant plate, said fuel plate being positioned with the sealing element portion thereof located adjacent the edge of the membrane on one side of the latter and said oxidant plate being positioned with the sealing element portion thereof located adjacent the edge of the membrane on the opposite side thereof, said sealing element portion of the fuel plate having a surface bonded to an area on said one side of said membrane and said sealing element portion of the oxidant plate having a surface bonded to an area on said opposite side of said membrane.

5. A proton exchange membrane fuel cell as set forth in claim 4, comprising an integrated current collector for each side of the membrane.

6. A method for preparing a proton exchange membrane fuel cell comprising:
providing a plate having a peripheral edge, said plate being either a fuel plate or an oxidant plate, said plate being made entirely of an acrylic plastic and including an integral sealing element portion at said peripheral edge;

furnishing a membrane formed from a material capable of being bonded to an acrylic plastic, said membrane having an edge;

arranging said membrane and said plate so that the sealing element portion of the latter and said edge of the membrane are adjacent one another; and bonding a surface of said sealing element portion to an area of said membrane at said edge of said membrane.

7. A method as set forth in claim 6, wherein said material is capable of being thermally bonded to an acrylic plastic using heat and compression and said surface of said sealing element is thermally bonded to said area.

* * * * *